Oct. 4, 1932.  S. M. TEMPLETON  1,880,526
CLAMPING DEVICE
Filed Sept. 17, 1929
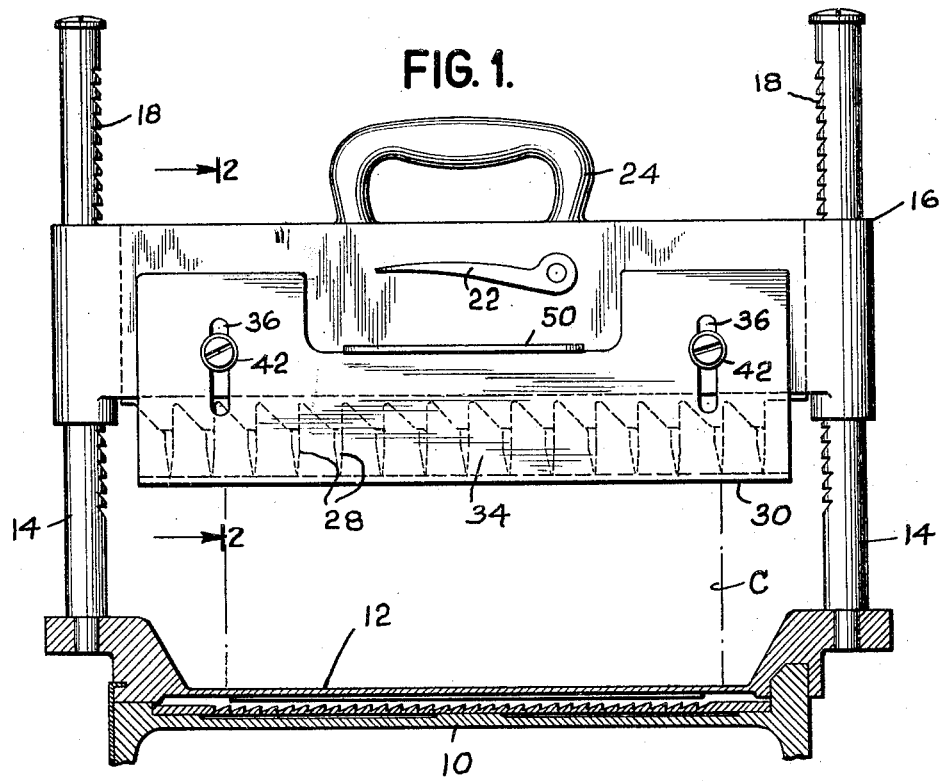
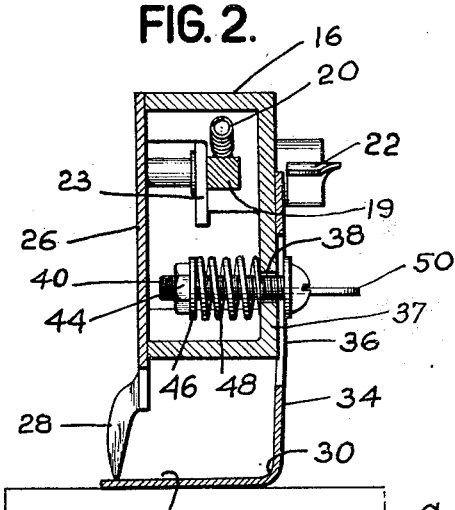
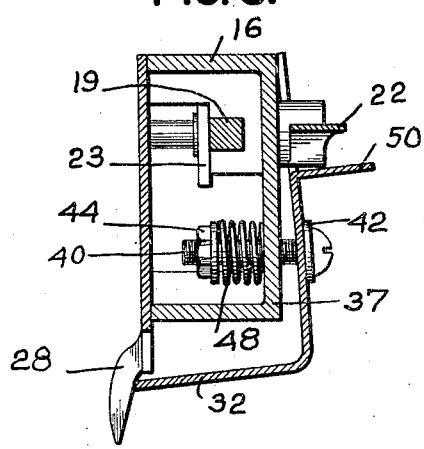
Inventor
S. M. Templeton
By his Attorney
W. M. Wilson Patented Oct. 4, 1932

1,880,526

UNITED STATES PATENT OFFICE

SAMUEL M. TEMPLETON, OF DAYTON, OHIO, ASSIGNOR TO DAYTON SCALE COMPANY, OF DAYTON, OHIO, A CORPORATION OF NEW JERSEY

CLAMPING DEVICE

Application filed September 17, 1929. Serial No. 393,202.

This case relates to food slicers and particularly to a novel clamp for holding food to be sliced.

A clamp is ordinarily designed to effectively hold only one class of food. Thus, a meat clamp is provided with prongs which help to hold the meat. If the meat clamp is used to hold cheese, the prongs break the cheese or perforate it to such an extent that it crumples after being sliced.

Obviously, if more than one class of food is to be sliced, a plurality of different appropriate clamps are required. In addition to the expense involved, it is inconvenient and time-consuming to remove one clamp from the slicer and replace it with another when changing the article operated on.

The object of this invention is to provide a clamp which may effectively clamp more than one class of article.

Further, the object is to provide such a clamp with selectively usable clamping parts, either of which may be with slight manipulation placed in effective operation.

More specifically, the object is to provide a combination meat and cheese clamp.

Other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view of the novel clamp;

Fig. 2 is a section on line 2—2 of Fig. 1; and

Fig. 3 is a similar section with the clamping parts in different relative positions.

The meat clamp per se is substantially the same as that disclosed in Patent No. 1,366,658 and will be described only insofar as it is necessary to a full understanding of the invention.

In Fig. 1 is shown the usual carriage 10 which is moved back and forth parallel to the knife. Slidably supported on carriage 10 is the meat table 12 which moves transversely to the plane of the knife. This transverse movement is effected after each slicing operation in order to feed the article carried on the meat plate across the knife edge so that the knife may cut off a slice upon the next movement of the carriage towards the knife. The meat plate 12 is provided with a pair of vertical posts 14 for guiding the clamp 16 thereon. Each post is provided with ratchet teeth 18 which are engaged by pawls 19 (Fig. 2) normally urged towards the teeth by springs 20 (Fig. 2). The pawls prevent upward movement of the clamp but may be released by rocking the lever 22 which actuates a cam 23 to retract the pawls. For conveniently manipulating the clamp, a handle 24 is provided.

The clamp 16 comprises a rectangular housing, one side 26 of which is detachable. This side has an extended portion formed with prongs 28 adapted to hold meat or similar articles but not effective or desirable for clamping articles such as cheese.

For holding cheese or similar articles, a clamp 30 is provided consisting of two sides 32 and 34 bent at right angles to each other. The horizontal side 32 is adapted to engage the portion of the cheese C as shown in Figs. 1 and 2. The vertical side 34 is provided adjacent each end with a long slot 36. The side 37 of the clamp 16 opposite side 26 is provided with a pair of holes 38 each in line with the adjacent slot 36 of clamp 30. To secure clamp 30 to the clamp 16, a screw 40 is passed through each slot 36 and hole 38, the head of the screw and a washer 42 abutting the outer surface of side 34 to limit the movement of the screw relative to said side. A nut 44 is threaded on the screw and between a washer 46 freely movable against the face of the nut and the inside surface of side 37 a helical spring 48 surrounds the screw. This spring tends to move the screw to the left (as viewed in Figs. 2 and 3) and thereby cause the head of the screw to securely hold the side 34 flat against the outer face of side 37.

When the cheese clamp is in effective position, as shown in Figs. 1 and 2, the plate 32 is in contact with and shielding the prongs 28. In this position, the smooth under side of the plate 32 clamps the cheese on the meat table. When it is desired to clamp meat, the operator grasps a projecting lug 50 on the clamp 30 and pulls upwardly. The prongs will cam the plate 32 backwardly which movement is permitted by the yielding of springs 48 and the clamp 30 will take the position shown in Fig. 3. In this position, prongs 28 are free to clamp meat.

The slot 36 is made long enough so that the plate 32 when in the position shown in Figs. 1 and 2 may be adjusted relative to clamp 16 to clamp different size objects. This avoids moving the clamps 16 and 30 as a unit by manipulation of handle 24 and lever 22.

The operation of the combination meat and cheese clamp is believed clear from the above description of the parts. It should be understood that the clamping parts may be varied to clamp other kinds of objects than those specified in the present case, and that other changes may be made within the intent and purview of this invention without departing therefrom. It is therefore desired to be limited only by the scope of the following claims:

1. A clamp comprising a fixed member and a movable carrying member between which an article may be disposed, a clamping element movably mounted on the carrying member for adjustment thereon from inoperative to operative clamping position and vice versa, a device for securing the element in inoperative position on the carrying member, said element being normally urged by pressure of the clamped article to move from operative towards inoperative position, and means for preventing the pressure of the clamped article from effecting return of the element from operative towards inoperative position, said means comprising another clamping element operative when the first-named element is in inoperative position.

2. A clamp comprising a fixed member and a movable carrying member between which an article may be disposed, a clamping element movably mounted on the carrying member for adjustment thereon from inoperative to operative clamping position and vice versa, a device for securing the element in inoperative position on the carrying member, said element being normally urged by pressure of the clamped article to move from operative towards inoperative position, and means for preventing the pressure of the clamped article from effecting return of the element from operative towards inoperative position, said means comprising another clamping element rendered ineffective by said first-named element when the latter is in operative position.

3. A clamp comprising a carrier member, a clamping element, means for slidably guiding said element along one side of said member, and means for permitting said element a limited movement transversely to said side of the member, said means including a spring for normally opposing said transverse movement.

4. In a clamping structure, a downwardly movable carrier having its lower end formed as a clamp adapted to engage and grip an article, an element movably mounted on the carrier and having an idle position rearwardly of and above the clamp end and having engagement with the carrier while in the upper position to restrain movement of the element forwardly, resilient means for constantly urging the element forwardly and prevented by the interengagement of the element and the carrier while the element is in upper position from effecting movement of the element forwardly, said element being movably downwardly into a lower position below the lower end of the clamp end of the carrier to release said restraining engagement with the carrier, said resilient means thereupon actuating the element forwardly transversely of the plane of movement of the carrier into a position directly below the clamp end of the carrier in which lower position said element is adapted to engage an article.

In testimony whereof I hereto affix my signature.

SAMUEL M. TEMPLETON.